(12) United States Patent
Ayzenshtat et al.

(10) Patent No.: US 11,157,570 B2
(45) Date of Patent: Oct. 26, 2021

(54) RELATED NOTES AND MULTI-LAYER SEARCH IN PERSONAL AND SHARED CONTENT

(71) Applicant: Evernote Corporation, Redwood City, CA (US)

(72) Inventors: Mark Ayzenshtat, San Mateo, CA (US); Jakob Bignert, Mountain View, CA (US); Phil Libin, San Jose, CA (US); Phil Constantinou, San Francisco, CA (US); Connie Chan, East Palo Alto, CA (US)

(73) Assignee: EVERNOTE CORPORATION, Redwood City, CA (US)

( * ) Notice: Subject to any disclaimer, the term of this patent is extended or adjusted under 35 U.S.C. 154(b) by 272 days.

(21) Appl. No.: 13/852,283

(22) Filed: Mar. 28, 2013

(65) Prior Publication Data
US 2013/0318063 A1    Nov. 28, 2013

Related U.S. Application Data

(60) Provisional application No. 61/651,175, filed on May 24, 2012, provisional application No. 61/731,830, filed on Nov. 30, 2012.

(51) Int. Cl.
*G06F 16/951*    (2019.01)
(52) U.S. Cl.
CPC .................. *G06F 16/951* (2019.01)
(58) Field of Classification Search
CPC ........... G06F 17/3053; G06F 17/30528; G06F 17/30643; G06F 17/30646; G06F 17/30867; G06F 16/2365; G06F 16/24522; G06N 7/00
See application file for complete search history.

(56) References Cited

U.S. PATENT DOCUMENTS

| 6,012,053 | A  * | 1/2000 | Pant ...................... G06F 16/338 |
| 6,675,213 | B1 * | 1/2004 | Schmonsees ........... G06F 16/95 |
|           |      |        | 709/225 |
| 7,734,631 | B2 * | 6/2010 | Richardson ....... G06F 17/30899 |
|           |      |        | 707/749 |

(Continued)

OTHER PUBLICATIONS

U.S. Appl. No. 13/658,474, filed Oct. 23, 2012, Libin et al.
(Continued)

*Primary Examiner* — Albert M Phillips, III
(74) *Attorney, Agent, or Firm* — Morgan, Lewis & Bockius LLP

(57) ABSTRACT

Displaying relevant data subsets of at least one data collection includes providing an input data subset, determining a plurality of partial relevance values for different characteristics of each of the plurality of data subsets of the at least one data collection with respect to the input data subset according to a term frequency of terms in the input data subset and term in each of the plurality of data subsets of the at least one data collection and according to an inverse document frequency of the terms, determining a relevance of each of the plurality of data subsets of the at least one data collection based on the partial relevance values of the different characteristics, and displaying at least a portion of the data subsets of the at least one data collection in order of relevance.

22 Claims, 10 Drawing Sheets

(56) References Cited

U.S. PATENT DOCUMENTS

| | | | | |
|---|---|---|---|---|
| 8,001,140 | B2* | 8/2011 | Dexter | G06F 16/93 |
| | | | | 707/766 |
| 8,041,694 | B1* | 10/2011 | Bayardo | G06F 16/3347 |
| | | | | 707/705 |
| 8,073,830 | B2* | 12/2011 | Fontes | G06F 16/951 |
| | | | | 707/706 |
| 8,090,740 | B2* | 1/2012 | Morris | G06F 17/30876 |
| | | | | 707/706 |
| 8,122,043 | B2* | 2/2012 | Buckley | G06F 16/31 |
| | | | | 707/759 |
| 8,145,617 | B1* | 3/2012 | Verstak | G06F 16/951 |
| | | | | 707/708 |
| 8,255,819 | B2* | 8/2012 | Chang | G06F 16/9535 |
| | | | | 715/769 |
| 8,370,345 | B2* | 2/2013 | Spangler | G06F 16/334 |
| | | | | 707/728 |
| 8,595,252 | B2* | 11/2013 | Wu | G06F 17/30867 |
| | | | | 707/765 |
| 8,676,797 | B2* | 3/2014 | Rohrs | G06F 16/9535 |
| | | | | 707/732 |
| 8,799,273 | B1* | 8/2014 | Chang | G06F 16/958 |
| | | | | 707/722 |
| 8,868,586 | B2* | 10/2014 | Toebes | G06F 17/30864 |
| | | | | 707/736 |
| 9,098,574 | B2* | 8/2015 | Brown | G06F 17/30731 |
| 2002/0111941 | A1 | 8/2002 | Roux et al. | |
| 2004/0015490 | A1* | 1/2004 | Snyder | G06F 16/951 |
| 2005/0102630 | A1* | 5/2005 | Chen | G06F 40/151 |
| | | | | 715/770 |
| 2005/0177574 | A1* | 8/2005 | Riley | G06F 17/30873 |
| 2007/0266342 | A1 | 11/2007 | Chang et al. | |
| 2008/0005101 | A1* | 1/2008 | Chandra | G06F 16/951 |
| 2008/0195657 | A1* | 8/2008 | Naaman | G06K 9/00677 |
| 2008/0235209 | A1* | 9/2008 | Rathod | G06F 16/3325 |
| 2009/0192985 | A1* | 7/2009 | Bolls | G06F 16/3326 |
| 2009/0271388 | A1* | 10/2009 | Murdock | G06F 16/748 |
| 2010/0262659 | A1* | 10/2010 | Christiansen | G06F 17/241 |
| | | | | 709/205 |
| 2010/0312771 | A1* | 12/2010 | Richardson | G06F 16/957 |
| | | | | 707/749 |
| 2010/0318893 | A1* | 12/2010 | Matthews | G06F 40/169 |
| | | | | 715/230 |
| 2011/0137933 | A1* | 6/2011 | Pelenur | G06F 16/9577 |
| | | | | 707/769 |
| 2011/0219012 | A1* | 9/2011 | Yih | G06F 17/30 |
| | | | | 707/749 |
| 2012/0059811 | A1 | 3/2012 | Libin et al. | |
| 2012/0060098 | A1 | 3/2012 | Libin et al. | |
| 2012/0191728 | A1 | 7/2012 | Libin et al. | |
| 2013/0212463 | A1 | 8/2013 | Pachikov et al. | |
| 2013/0226935 | A1* | 8/2013 | Bai | G06N 20/00 |
| | | | | 707/748 |

OTHER PUBLICATIONS

Manning, Christopher D., et al., "An introduction to information Retrieval," Cambridge University Press, Apr. 1, 2009, http://nlp.stanford.edu/R-book/pdf/irbookonlinereading.pdf, Figure 9.2, 4 pp.
Evernote Corporation, International Search Report and Written Opinion, PCT/US2013/042155, dated Dec. 9, 2013, 7 pgs.
Evernote Corporation, International Preliminary Report on Patentability, PCT/US2013/042155, dated Jul. 14, 2015, 6 pgs.
Evernote Corporation, Extended European Search Report, EP13793567.2, dated Sep. 5, 2016, 8 pgs.

* cited by examiner

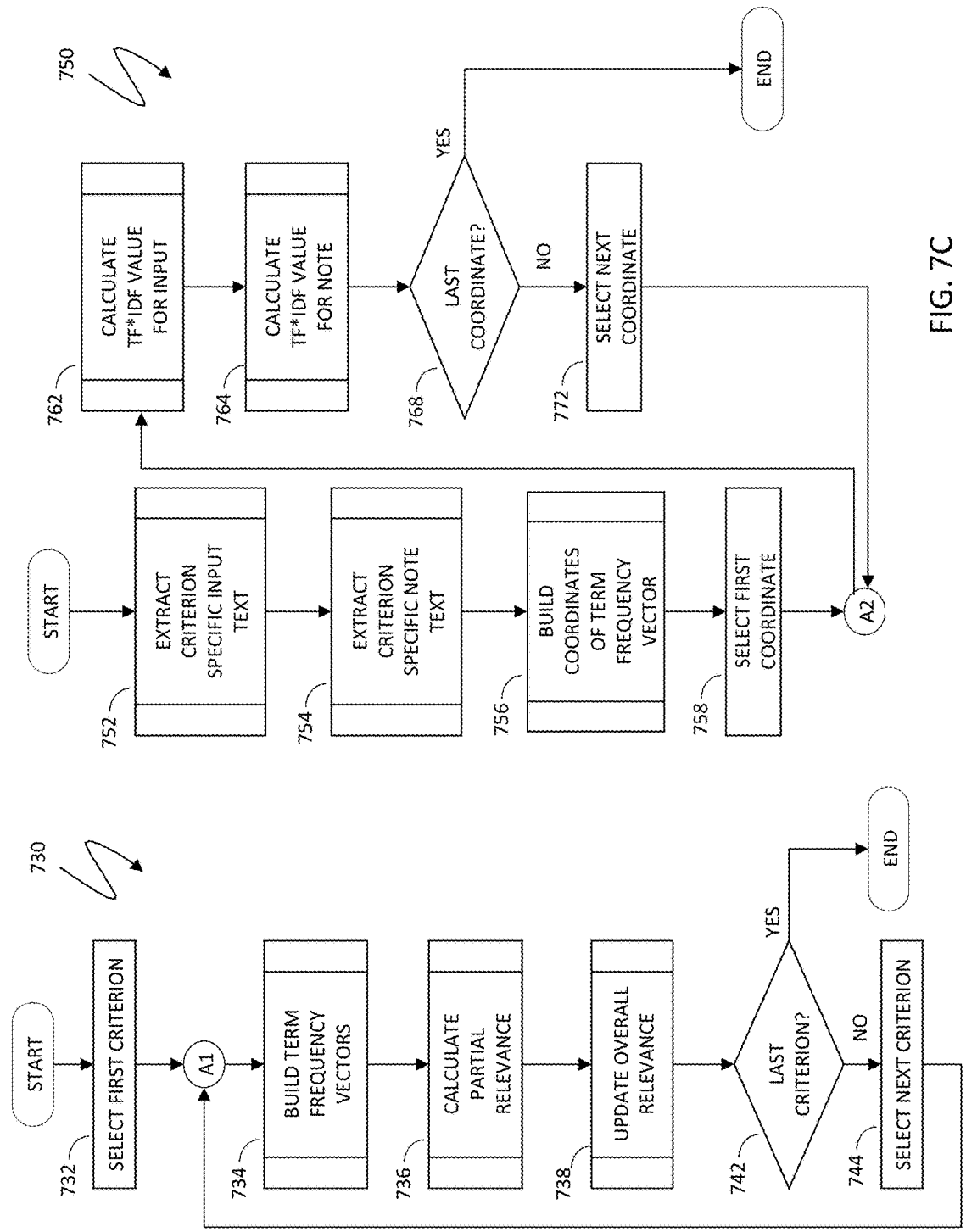

RELATED NOTES AND MULTI-LAYER SEARCH IN PERSONAL AND SHARED CONTENT

CROSS-REFERENCE TO RELATED APPLICATIONS

This application claims priority to U.S. Prov. App. No. 61/651,175, filed May 24, 2012, and entitled "METHOD AND PROCESS FOR IDENTIFYING RELATED NOTES WITH MULTI-SOURCE COMPONENTS," which is incorporated herein by reference, and claims priority to U.S. Prov. App. No. 61/731,830, filed Nov. 30, 2012, and entitled "METHODS FOR MULTI-LAYER SEARCH IN PERSONAL AND SHARED CONTENT," which is incorporated herein by reference.

TECHNICAL FIELD

This application relates to the fields of information management, Internet search and presentation of personal and shared information.

BACKGROUND OF THE INVENTION

Efficient search for content and documents has become an important productivity factor. According to research data, knowledge workers spend 38% of their time searching for information. A 2012 global survey of information workers and IT professionals by IDC has discovered that, on average, such worker spends about five hours per week searching for documents, and almost half of that time results in searching for documents that are not found.

With the proliferation of cloud-based, multi-platform content databases, such as the Evernote service and software provided by the Evernote Corporation of Redwood City, Calif., efficient search in personal and shared content becomes an all-important feature. Evernote users conduct many millions of searches in their content collections (notebooks) each week, including searches in text, images containing typed text, handwriting, etc. Additionally, content sharing options allow users to access other people's content collections which are also searchable and provide supplementary content. Content sharing also applies to deployment of content management systems within organizations and companies. Organization members or company employees may gain access to organization-wide content collections created by different departments and individuals; these collections may cover different knowledge areas, such as technology, product management, marketing, sales, HR, employee benefits, etc. Search options may apply to such collections and further expand an area of content search. Also, searching in limited collections of personal content that is shared within a group or organization by no means eliminates exploring common web content via general purpose or specialized search engines.

Generally, different types of search coexist in the everyday lives of millions of individuals. However, user perceptions of various search practices, their specific requirements and efficiency assessments, and their sense of relevance of search results obtained from different content collections and/or through the use of different search terms and techniques broadly fluctuate from individual to individual, from organization to organization and from case to case. Traditional challenges of the search process, such as not remembering exact search terms, as well as the well-known synonym, context and homograph search problems add to the complexity of the task and affect individual and team productivity. Additionally, searches in diverse content collections may often be disconnected, and may provide inconsistent results and require repetitive efforts by a user.

Search results in diverse data collections and data entry into such collections may benefit from the notion of related items. Related items may be broadly used in online publishing, shopping, travel, search and numerous other web services and applications. References to related articles may help news site visitors expand their view of original publication or topic; lists of related goods may lead online shoppers to better product choices; the notion of relatedness has overall positive impact on web experiences and user productivity. Detection of relevant items on public websites may be based both on linguistic similarity of items and on user voting derived from their visiting history; one of the key metrics of relatedness of two pages is the frequency of their mutual occurrence within browsing paths of visitors. Browsing and action history of related items may even be reflected in naming conventions on prominent websites: thus, product pages at Amazon.com display two footers "Frequently Bought Together" and "Customers Who Bought This Item Also Bought" with lists of related items.

Users of personal content databases such as Evernote are widely utilizing web and document clipping. Once a significant volume of personal content items has been accumulated in such databases—for example, in Evernote notebooks—it becomes desirable to account for the existing materials when new items are added to the database; this requires identifying related items previously entered into the database.

Social browsing history that is successfully used for discovering related items on public websites may not work well for detecting such items in personal databases, since the personal databases may be accessible only by individuals who compiled these databases or by relatively small groups of people within an enterprise or other organization. Another difference from general web surfing is apparent in connection with the clipping process: users often select only a small portion of web page content, rather than adding a whole article to the personal database. Hence, unlike a social browsing situation, it is the selected piece, rather than the whole article, that represents the context for identifying related items. In addition, content items in personal databases have different sets of attributes compared to web pages; such attributes include, for example, capturing locations, attachments, text extracted from images via OCR and ICR technologies, etc. which offer additional opportunities for identifying related items and requires customized methods of such identification.

Accordingly, it is desirable to develop systems and methods of identification of related items in personal data collections that address significant differences between public web pages and personal content databases and are available through a whole spectrum of individual, enterprise, and public search.

SUMMARY OF THE INVENTION

According to the system described herein, displaying relevant data subsets of at least one data collection includes providing an input data subset, determining a plurality of partial relevance values for different characteristics of each of the plurality of data subsets of the at least one data collection with respect to the input data subset according to a term frequency of terms in the input data subset and terms in each of the plurality of data subsets of the at least one data collection and according to an inverse document frequency of the terms, determining a relevance of each of the plurality of data subsets of the at least one data collection based on the partial relevance values of the different characteristics, and displaying at least a portion of the data subsets of the at least one data collection in order of relevance. The input data subset may be a web page, a document, a portion of a document, a user search query submitted to a public search engine, a user search query submitted to a database, and/or a pre-processed search result obtained from a public search engine. The data subsets of the at least one data collection may initially be determined using search results from a public search engine to form an extended query that is used to initially search the at least one data collection. The search results from the public search engine may be stripped of generic terms and web links prior to being used to form the extended query. Generic terms may be provided by a specially compiled system vocabulary. The data subsets of the at least one data collection may be digital notes and the at least one data collection may be a digital notebook. The digital notes may be displayed in a popup pane. When the input is a web page, the digital notes that are displayed may include a title of the web page and snippets of the digital notes that are displayed. When the input is a user search query submitted to a public search engine, the digital notes that are displayed may be shown proximate to search results from the public search engine. The characteristics may include a title, a body portion of the notes, and/or a tag. Relevance may be a weighted sum of the partial relevance values using criteria weights or may be a minimum of the partial relevance values multiplied by criteria weights. Partial relevance of each of the data subsets with respect to each of the characteristics may be determined using a cosine similarity between a vector corresponding to term frequencies and inverse document frequencies of each of the characteristics of the input data subset and a vector corresponding to term frequencies and inverse document frequencies of each of the characteristics of each of the data subsets. The data subsets of the at least one data collection may be included in a private data collection and/or a shared data collection.

According further to the system described herein, computer software, provided in a non-transitory computer-readable medium, determines relevant data subsets of at least one data collection. The software includes executable code that receives an input data subset, executable code that determines a plurality of partial relevance values for different characteristics of each of the plurality of data subsets of the at least one data collection with respect to the input data subset according to a term frequency of terms in the input data subset and terms in each of the plurality of data subsets of the at least one data collection and according to an inverse document frequency of the terms, and executable code that determines a relevance of each of the plurality of data subsets of the at least one data collection based on the partial relevance values of the different characteristics. The input data subset may be a web page, a document, a portion of a document, a user search query submitted to a public search engine, a user search query submitted to a database, and/or a pre-processed search result obtained from a public search engine. The data subsets of the at least one data collection may be initially determined using search results from a public search engine to form an extended query that is used to initially search the at least one data collection. The search results from the public search engine may be stripped of generic terms and web links prior to being used to form the extended query. Generic terms may be provided by a specially compiled system vocabulary. The data subsets of the at least one data collection may be digital notes and the at least one data collection may be a digital notebook. The digital notes may be displayed in a popup pane. When the input is a web page, at least some of the digital notes may be displayed and may include a title of the web page and snippets of the digital notes that are displayed. The input may be a user search query submitted to a public search engine and the digital notes may be displayed proximate to search results from the public search engine. The characteristics may include a title, a body portion of the notes, and/or a tag. Relevance may be a weighted sum of the partial relevance values using criteria weights or may be a minimum of the partial relevance values multiplied by criteria weights. Partial relevance of each of the data subsets with respect to each of the characteristics may be determined using a cosine similarity between a vector corresponding to term frequencies and inverse document frequencies of each of the characteristics of the input data subset and a vector corresponding to term frequencies and inverse document frequencies of each of the characteristics of each of the data subsets. The data subsets of the at least one data collection may be included in a private data collection and/or a shared data collection.

Lists of related items are retrieved from personal or shared databases based on linguistic similarities between textual input data and existing content items (hereinafter referred to as "input" and "item(s)"). An input may include a public or other web page, a document or a portion thereof offered by a user, a user search query submitted to a public search engine, a private or a shared database, or a pre-processed search result obtained from a public search engine and submitted as a query to a private or a shared database, as explained elsewhere herein. In the latter case, the term "multi-layer search" will be used, reflecting the dependence of an input on the previously obtained search results in response to an original user query. An output includes a list of notes ordered by their relevance scores; a portion of this list with the highest scores or the complete list may be displayed to the user in different information processing scenarios, as explained elsewhere herein.

Whenever an input is a fragment of a web page selected by a user and designated for clipping into that user's personal database (or into a shared database to which the user has sufficient access privileges), the following different embodiments and user scenarios may apply:

(a) The user selects a fragment of an original web page with the intent of memorizing and possible future retrieval of the information. Examples are a new fact in an article, an upcoming event on an entertainment page, a product name or a feature in an online review, etc. It may be a continuous fragment of a web page or a document (in accordance with the predominant desktop browsing and selection metaphor). The fragment may be limited to one or two selected paragraphs, since the user avoids over-selecting of unnecessary information and is bound to a contiguous selection option. Under such scenario, relevant items may reflect past clipping actions performed by the user for similar information, which may invite grouping, tagging or linking of the new item with relevant items or simply avoiding repetitive filing of the already present data.

(b) The user extracts principal content from a web page using dedicated software utilities, such as Evernote Clearly. In some embodiments, such refined content may be used for the same purpose as in case (a), so that the extraction of the principal content serves merely as a convenient page clean-up feature. In other embodiments, the principle content of the page may be an article intended for an in-depth reading and comprehension. In such scenario, building a list of relevant items for the whole article is helpful as it brings to user's attention additional knowledge in the form of similar topics reviewed by the user in the past. Additionally, the user may selectively highlight portions of the refined article (in the event that a software for extracting principal items supports multiple selection in the article), which hints at the most important portions of article. This consideration justifies augmenting the initial list of relevant items built for the whole article with the items particularly applicable to selected fragments. Examples are a political article about presidential elections with highlighted portions about differences in candidates' views, a feature list for an explored product where a few highlighted features are particularly important for the user, etc. In contrast with case (a), in scenario (b) the lists of relevant items may be built both for the whole text of the principal content and for its user selected fragment(s).

Another type of input for discovering relevant items is a search query submitted by a user to a public, general purpose or specialized web search engine, such as Google or Microsoft Bing. The general purpose search engine returns search results in the form of multiple snippets from the discovered relevant pages, typically ordered by the decreasing relevance with respect to the search query. The system then processes the snippets that include, in an embodiment, the first page of search results (for example, the top ten snippets) to form an expanded query. Processing includes filtering out page URLs, most common words and other terms that might be present in page titles, rather than express the page content (examples of such title specific items may be "Wikipedia, the free encyclopedia", "Yahoo! News", "Facebook Wall", etc.). For such filtering, the system may use a vocabulary of most popular and non-specific terms appearing in search snippets. After snippet cleanup is completed, the system may merge the snippets and feed the combined text, along with the initial user query, into a (different) search engine for personal and shared content collections.

In another embodiment, the original search query may be submitted by a user directly to personal or shared data collections. The system then silently submits the query through the API to public or specialized search engine(s), then retrieves search results and uses them to form the expanded query, as explained elsewhere herein. At the next step, the system searches personal or shared content collections using the original and the expanded queries.

An item in a personal database (hereinafter also called a note) may include typed or clipped text, images, handwriting, embedded audio, video, and attachments in a variety of text-based, binary or combined formats. An item may have various parts and attributes such as a title, which may be entered by the user or automatically generated, an item body, attachment(s), a history of revisions, a source URL in case when a portion of the item or the whole item was clipped from a webpage, other reference info, one or multiple assigned or auto-assigned tags, creation and last update times, location(s) where the item was created and/or last updated, author name(s), etc. These parts and attributes may play different roles and have different weights in determining the relatedness score between the item and an input. In an embodiment, parts and attributes of a note explicitly defined by the user (such as a note title or tags) have higher priority than the auto-generated or clipped parts and attributes.

The proposed method for creating the list of relevant items for a given input combines a part-and-attribute-based multi-criteria similarity with filtering rules. In an embodiment, similarity between the input and an individual item from a personal or shared data collection may be measured according to a multi-criteria comparison between term frequency vectors comprised of tf*idf weights of the input and the item. Some or all of item parts and attributes are considered as criteria; for each criterion, two term frequency vectors are built, one for the input and another for an attribute-related interpretation of the item. For example, a body text part of an item results in two term frequency vectors—one for the input, another for the item—where the set of terms, i.e. components or coordinates of each term frequency vector includes all words (and possibly bigrams) found in the input or in the item. Coordinate values are tf*idf weights of the coordinate term respectively for the input and the item, where the term frequency multiplier "tf" is calculated directly based on the present text, while the inverse document frequency multiplier "idf" is defined within a corpus and includes all items in the personal database, plus the input. For those terms that are present only in one of the two texts, the coordinate value corresponding to another text is set to zero. In another embodiment, combinations of parts with other parts, attributes with other attributes, and parts with attributes may represent additional criteria. Examples include such criteria as title+title, tag+input and image-text+input; each criterion creates a couple of vectors, with their terms corresponding, respectively, to the text sets item title+input page title (or document title), item tags (interpreted as plain text)+all input text, and text retrieved from item's images via OCR and ICR+all input text. Specific choice of item and input parts, attributes, and their combinations for the multi-criteria optimization may depend on tasks and may even be customized/chosen by a user.

For each criterion (part, attribute or their combination) designated for the multi-criteria calculation of the relatedness between the input and the item (or, equivalently, the relevance of the item with respect to the input), a partial relevance value for that criterion is defined as a vector similarity measure between term frequency vectors built for the input and the item, as explained elsewhere herein. In an embodiment, cosine similarity may be used (cosine of the angle between the two vectors, calculated as their scalar product divided by the product of their lengths).

After the partial relevance values have been built for all criteria and for all items in personal and/or shared collection(s) with respect to a given input, different multi-criteria optimization methods can be employed for defining the list of relevant items. In one embodiment, an overall measure of item relevance with respect to an input is defined as a weighted sum of partial similarities: weight coefficients of different criteria are chosen to reflect their relative importance. The list of relevant items with respect to such aggregation may be formed by cutting off the items whose relevance values fall below a predefined threshold; alternatively, the list may be built by choosing a pre-defined maximum number of relevant items, or by using other methods. In another embodiment, a Pareto frontier (optimum set) of similarity vectors built for all items with respect to an input, where each coordinate of a similarity vector represents a criterion, may be used as an initial or a final list of relevant items. In yet another embodiment, normalized partial similarity values for each attribute may be interpreted as membership values of a fuzzy linguistic variable corresponding to an item being relevant to an input by an attribute X (a standard normalization can be done by multiplying a similarity value by a weight of a criterion and dividing by the maximum overall value). In this case, a fuzzy conjunction that an item is relevant to an input by all criteria can serve as an aggregating function to determine overall relevance of items.

In addition to serving as the choice criteria, certain note parts and/or attributes may simultaneously or alternatively produce deterministic, probabilistic or fuzzy rules for further addition and/or filtering of related items. In an embodiment where relevant items are detected in a location-aware situation, items taken around the same location with a highly relevant item may be added to the list of relevant items irrespective of their textual similarity to the input. Analogously, for time-sensitive items such as encounters in the Evernote Hello software or in other calendar applications, items with their creation or last update time close to same for most relevant items selected via multi-criteria optimization may be added to the relevant list. In an embodiment based on fuzzy logic for the multi-criteria optimization, as explained elsewhere herein, membership functions may be built for such linguistic variables as close location and/or close time; subsequently, fuzzy rules may be merged with the fuzzy criteria into a single fuzzy relevance statement, such as an item being deemed relevant to an input by all attributes OR an item satisfies additional rules.

In addition to determining relatedness according to linguistic similarities between different components of an input and a note, as explained elsewhere herein, the system further adjusts relevance scores in the event when a list of related notes have been produced via a multi-layer search query. In this case, the nature of content collections where the search has been performed is taken into account. It has been experimentally discovered that users tend to appreciate additional relevant results from an extended query when the multi-layer search has been performed in their personal data collections. For shared collections (such as, organization-wide databases), users don't rely so much on the extended query, especially (and understandably) when the retrieved content has not been previously known to the user. For this reason, a system scoring mechanism, which defines the relevance of results retrieved from personal, shared and organization-wide content collections, assigns lower relevance scores of search results retrieved from the shared content if they match predominantly the additional query terms, as opposed to matching the terms of the initial user-defined query. In certain embodiments, additional portion of the query may be completely discarded for search in non-personal databases.

In one embodiment, priorities between search results in personal and shared collections using the original and extended queries are expressed by the following weight matrix:

|  | Personal data collections | Shared data collections |
| --- | --- | --- |
| Original user query | 1.0 | 0.8 |
| Extended query | 0.8 | 0.3 |

Prioritization is defined by relative ratios between these coefficients rather than absolute values. These weights influence the order of related notes on the list and hence the nomenclature and order of notes that will be displayed to the user.

Displaying related notes may depend on the usage scenario. Thus, in the clipping scenario when a user intends to add a whole web page or a document or their selected portions to a personal or shared collection of notes, snippets for a predefined number of related notes from top of their list may be displayed in a separate pop-up pane (as is the case with Evernote Web Clippers). In some embodiments, the user may be allowed to merge chosen or all related notes with the new note, interlink the new and the related notes, to build a list of titles of related and new note linked to the new and related notes (table of contents), etc. In the scenario where a user conducts a public search enhanced with additional search in personal and shared note collections using the extended query, related notes may be displayed in a pane integrated with the web page of search results. In yet another scenario where a search in personal and shared collections is enhanced with an additional search using the extended query, as explained elsewhere herein, several related notes may be displayed in a separate popup pane, in an adjacent tab with the main search results or in-line with the results, in which case related notes may be color-coded, labeled or otherwise distinguished from the main results.

BRIEF DESCRIPTION OF THE DRAWINGS

Embodiments of the system described herein will now be explained in more detail in accordance with the figures of the drawings, which are briefly described as follows.

FIGS. 7A-7D are system flow diagrams that describe processing associated with different embodiment of the system described herein.

DETAILED DESCRIPTION OF VARIOUS EMBODIMENTS

The system described herein provides a mechanism for discovering related data subsets (e.g., digital notes) in personal and shared data collections (e.g., digital notebooks) in response to a user-defined input, whereby each note may include multiple components that have different priorities with respect to the note's relevance to the input. Depending on the character of an input, available set of data collections, display space limitations and other factors, different methods are applied for determining the optimal set of related notes and the final subset of such notes displayed to the user.

Figure 1:
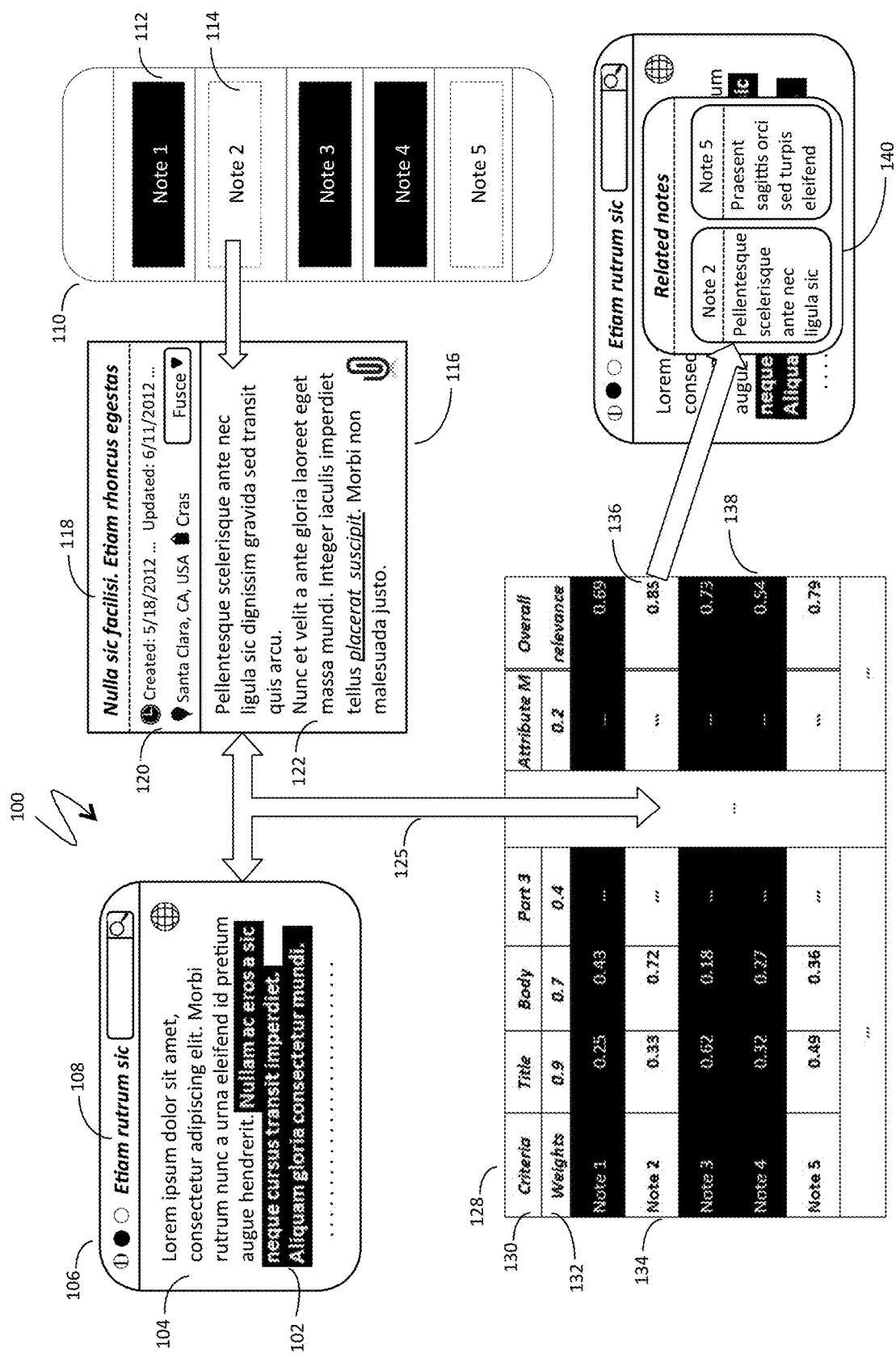
FIG. 1 is a schematic illustration of inputs, relevance calculations and a displayed list of related notes in the clipping scenario, according to an embodiment of the system described herein.

FIG. 1 is a schematic illustration 100 of inputs, relevance calculations and displayed list of related notes in the clipping scenario, according to an embodiment of the system described herein. In this scenario, a user designates material for clipping into a personal and shared database; the material may include a document, a web page, an article extracted from a web page using page cleanup software, such as Evernote Clearly, or a portion of a document, page or article, for example, a selection of text. Here, a portion 102 of the content 104 of a web page 106 with a title 108 is selected as a user input. The goal of the system in this embodiment is discovering related notes in a personal data collection 110. Unrelated and related notes are schematically illustrated by black and white rectangles, exemplified by a pair of adjacent rectangles 112 and 114. A detailed view 116 of the note 114 explains multiple parts and attributes of the note that may serve as criteria during the discovery of related notes. Thus, the note 116 has a plurality of characteristics including a title 118, an attribute area 120, which includes creation and last update times, a location, a tag area, and a notebook designation for the note, and a body 122, which may include text, images, attachments, links to other notes, etc. For a given note (such as the note 116) and an input, a set of criteria may be defined, each criterion corresponding to a characteristics in the chosen set of characteristics. For each criterion in the set, a partial relevance value may be calculated. Partial relevance values may be subsequently aggregated into an overall relevance measure of a note with respect to the input, as illustrated by an arrow 125. This leads to a binary relevance relation, i.e. a matrix 128 where a top row 130 lists the criteria (as column headings) and a next row 132 includes corresponding weights. Remaining matrix rows 134 represent notes in the data collection 110 and numbers in each such row represent partial relevance values for different criteria columns. Calculations of partial relevance values are explained elsewhere herein.

An overall (aggregated) relevance value 136 is assessed as a weighted sum of partial relevance values using criteria weights 132. In other embodiments, relevance values may be determined as a minimum of the partial relevance values multiplied by the criteria weights. Notes with aggregated relevance values below a given threshold may be discarded (rows of the matrix 128 with black backgrounds, corresponding to the notes 1, 3 and 4), while notes with sufficiently high relevance values may be included on the list of related notes (rows of the matrix 128 with white backgrounds, corresponding to notes 2 and 5) and snippets of the related notes may be displayed in a popup window 140. In an embodiment, a relative size of the display area 140 and a note snippet may limit the number of displayed related notes. In such a case, only a few related notes with top relevant values may be displayed in the popup list. Displaying related notes is described in more detail elsewhere herein.

Figure 2:
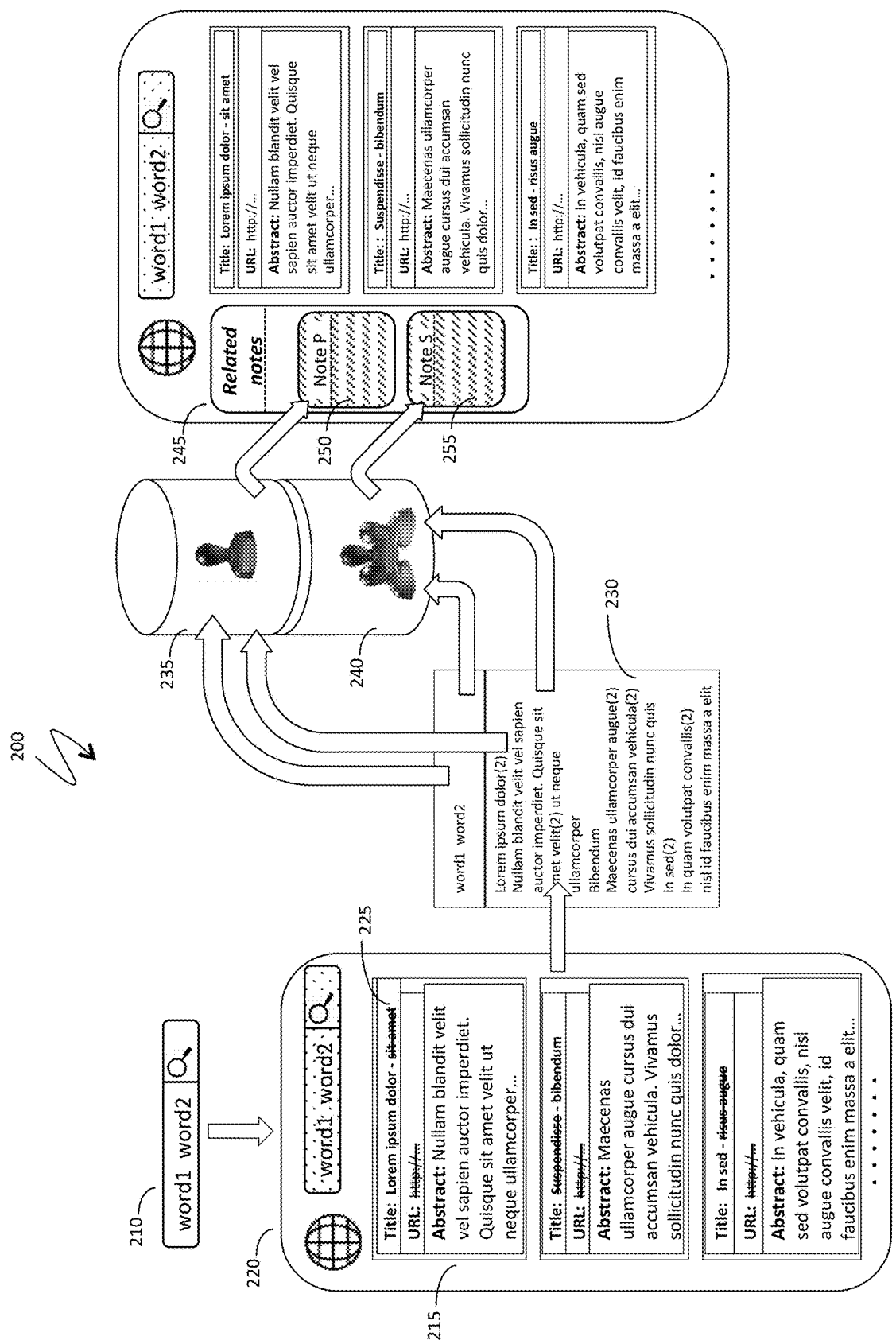
FIG. 2 is a schematic illustration of an initial and an extended search query, of an additional search and a displayed list of related notes in the search scenario, according to an embodiment of the system described herein.

FIG. 2 is a schematic illustration 200 of an initial and an extended search query, an additional search and a displayed list of related notes in the search scenario, according to an embodiment of the system described herein. In this scenario, a user enters search terms and the system performs a multi-layer search based on the initial terms and on an extended query built from search results for the initial terms obtained from a public (generic or specialized) search engine. The extended query is applied to personal and shared data collections and search results for the extended query may be ranked depending on which query (original or extended) discovers notes in which collection (personal or shared), as explained elsewhere herein. In the embodiment illustrated of FIG. 2 a user enters the initial search terms on a public web page and related notes from data personal and shared data collections are displayed alongside the public search results.

According to the system described herein, an initial query 210 is entered on a website 220 and is submitted to a public search engine, such as Google or Microsoft Bing. A list of search results 215 is displayed on a web page and is available to the system. The system selects a portion of most relevant search results (in an embodiment, all results from the first page or top 10 results ordered by relevance) and processes search snippets by filtering out site addresses (URLs) and generic terms 225 (such as "Yahoo!" or "Google News", a conventional Wikipedia title and other common words and phrases). The system then merges filtered search snippets into an extended query 230 and submits the extended query 230, in addition to the initial query, to the engine for obtaining relevant notes from personal data collections 235 and shared data collections 240. Additional relevant data sets from the data collections 235, 240 may be weighted, as explained elsewhere herein and ordered by decreasing relevance. Top results may be displayed in a related notes list 245, which in this embodiment is embedded into the web page with the original search results. Additionally, displayed notes may have indications from which collections the displayed notes had been obtained; thus, a note 250 ("Note P") was obtained from a personal collection, while a note 255 ("Note S") was obtained from a shared collection. Displaying related notes is discussed in more detail elsewhere herein.

Figure 3:
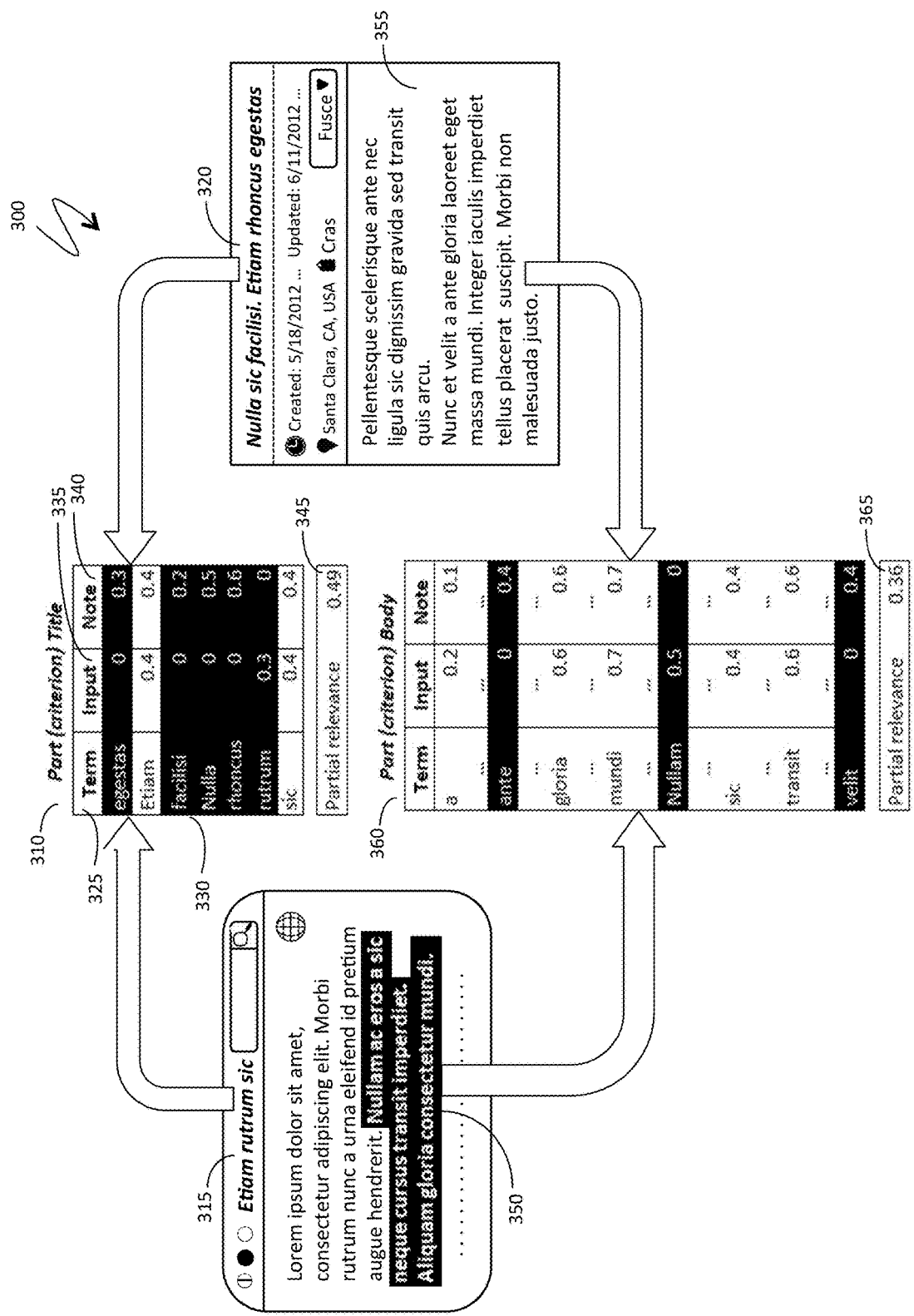
FIG. 3 illustrates term frequency vectors built for titles and bodies (two criteria) of an input and a particular note, according to embodiments of the system described herein.

FIG. 3 is a schematic illustration 300 of term frequency vectors built for titles and bodies (i.e. for two different criteria) of an input and a particular note, according to embodiments of the system described herein. For a note part Title (the first criterion), term frequency vectors may be represented by a three-column table 310. A left column 325 of the table 310 contains individual terms found in a title of an input 315 and a title of a particular note 320. In this embodiment, only individual words (not bigrams or more complex constructions) may be allowed as terms; hence, the column 325 contains all words present in the title of the input 315 and/or in the title of the note 320. In the table 310, terms are ordered lexicographically. Rows of the table 310 corresponding to terms found in both of the titles have white background, while rows for terms found in only one of the titles are marked black. Numbers in the table 310 are tf*idf values for the terms calculated for the input in a column 335 and for the note in a column 340. A resulting partial relevance value 345 with respect to the Title criterion (characteristics) is a cosine similarity measure between the two vectors represented by the columns 335, 340.

A Body criterion is processed similarly, based on selected text 350 in the body of the input 315 and text 355 of the body of the note 320. Two term frequency vectors in a corresponding table 360 determine a partial relevance value of 0.36 using cosine similarity.

Figure 4:
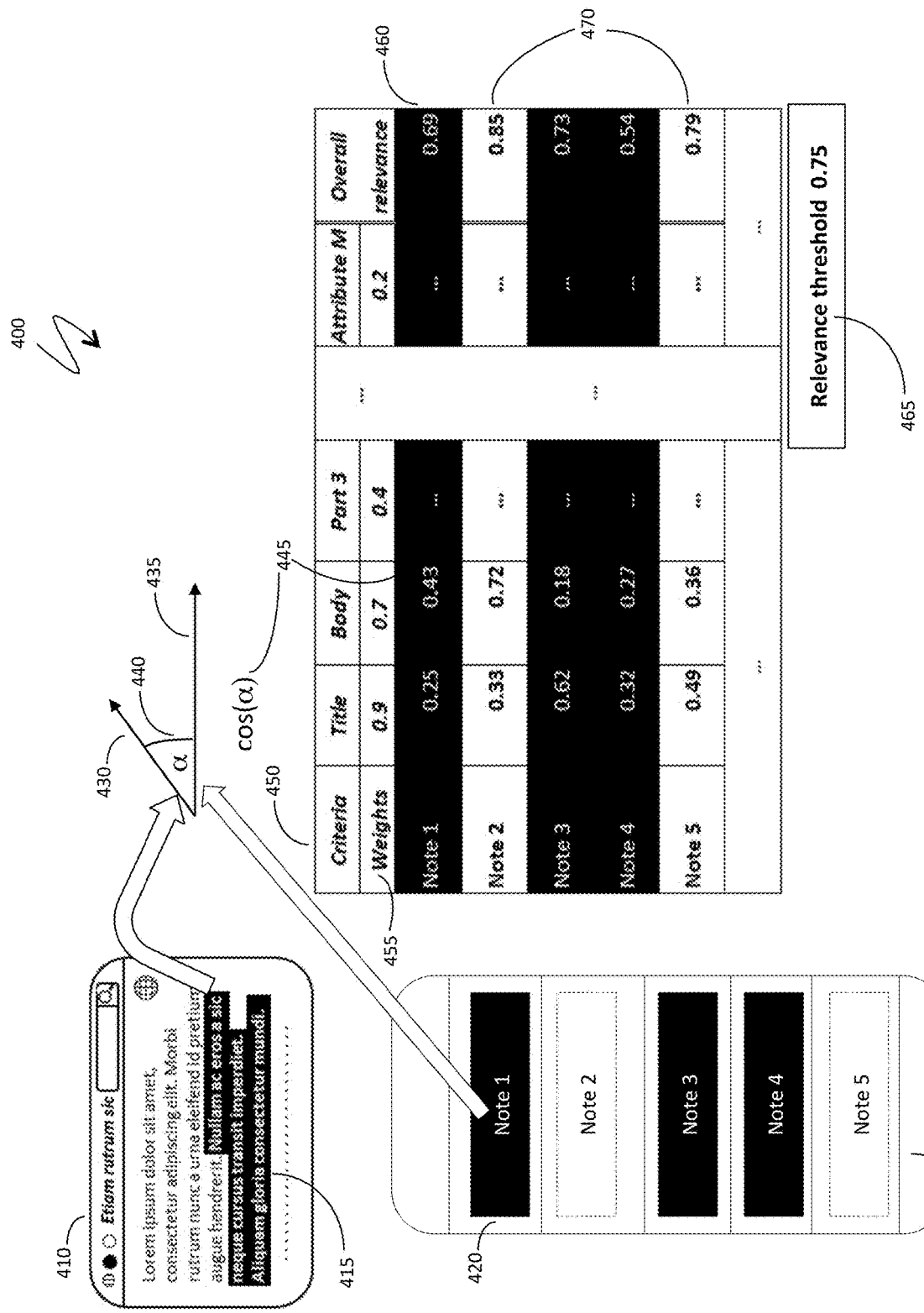
FIG. 4 illustrates partial relevance values, multi-criteria optimization, and choice of related notes, according to embodiments of the system described herein.

FIG. 4 is a schematic illustration 400 that further explains calculation of partial relevance values, multi-criteria optimization, and choosing related notes, according to embodiments of the system described herein. The illustration 400 is based on a body part of an input 410 and a note 420 from a personal or a shared data collection 425, as explained elsewhere herein (see FIG. 3). The body of the input is represented by selected text 415 and, together with the body text of the note 420, gives rise to two term frequency vectors 430, 435, (see, for example, the table 360 on FIG. 3). In an embodiment of the system illustrated in FIG. 4, partial relevance values of the note 420 by different criteria, or characteristics, is measured as a cosine similarity, i.e. a cosine of an angle 440 between term frequency vectors. A partial similarity value 445 is entered into a matrix 450 of a relevance relation. Subsequently, partial relevance values for all other criteria and notes may be entered into a matrix 450. In the embodiment illustrated in FIG. 4, an overall (aggregated) relevance value 460 for the note 420 is calculated as a weighted sum of partial relevance values using criteria weights 455. In order to determine a list of related notes, aggregated relevance values are compared with a relevance threshold 465; notes 470 that pass the threshold test are added to the list (shown on FIG. 4 with white background); the rest of the notes (shown on black background) are discarded.

Figure 5:
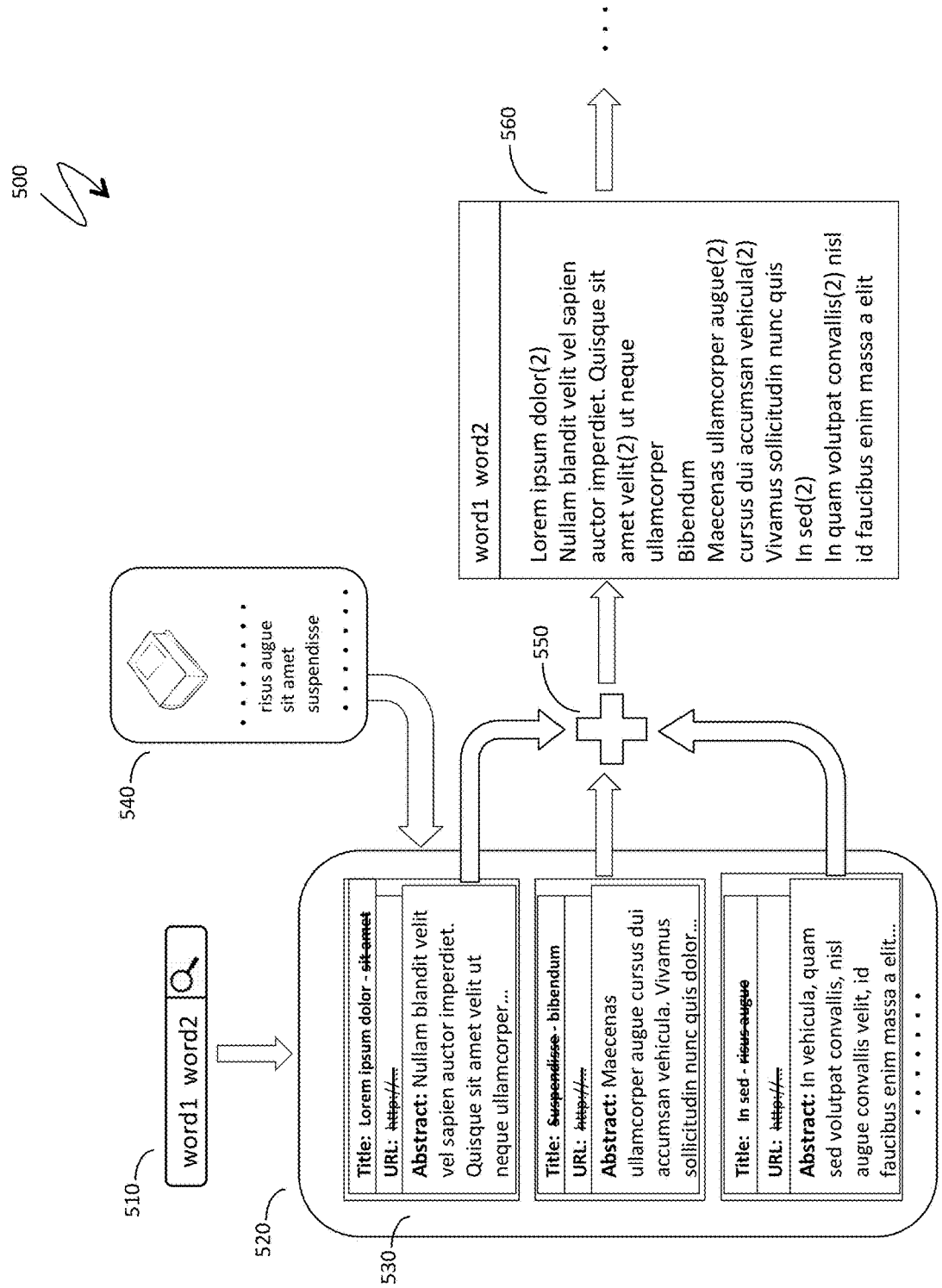
FIG. 5 is a schematic illustration of the steps to build an extended query in response to a user's original search query, according to an embodiment of the system described herein.

FIG. 5 is a schematic illustration 500 of building an extended query in response to a user's original search query, according to an embodiment of the system described herein. An initial user query 510 is submitted to a public search engine, which returns a list of search results 520 via a public page or an internal response to a system programmatic call. Most relevant items (snippets) of the search results are chosen for further processing, as explained elsewhere herein. Each snippet 530 is processed by filtering out a page URL and the most generic words found in a specially compiled system vocabulary 540. Examples of generic words include brand mottos and common informational phrases from page titles, such as "Google News", "Yahoo! News", "Wikipedia, the free encyclopedia", "IBM— Smarter Planet", etc. Truncated snippets are merged with some additional processing, illustrated by a plus sign 550; for example, frequency indicators for repeated words replace copies of the repeated words in the combined text. In this way, an extended query 560 is built, which is used to produce related notes from personal and shared data collections, as explained elsewhere herein (see FIG. 2).

Figure 6A:
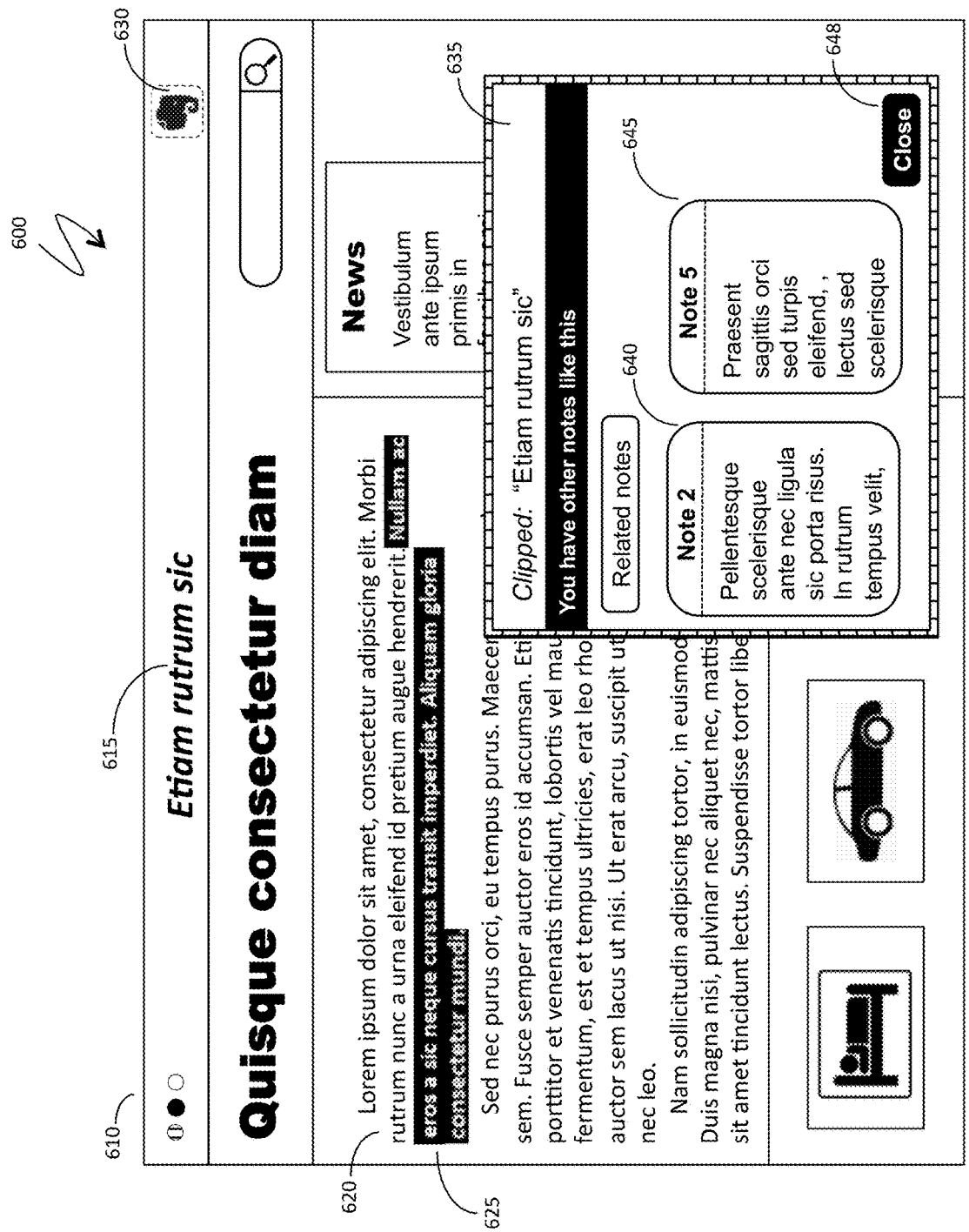
FIGS. 6A-6B are schematic illustrations of display options for related notes in different usage scenarios, according to embodiments of the system described herein.

FIG. 6A is a schematic illustration 600, showing a display option for a list of related notes during manual clipping of web site content by a user, according to an embodiment of the system described herein. A web page 610 with a title 615 is supplied with a clipping button 630, for example, with a button of the Evernote Web Clipper. A user reads an article 620 on the page 610 and selects a portion 625 of the article 620 for clipping. Upon pressing on the clipping button 630, the system provides page clipping (not shown on FIG. 6A) and simultaneously may build a list of related notes, as explained elsewhere herein. Related notes may be displayed in a popup pane 635, which may include the title of the clipped page and snippets of related notes 640, 645. The user may define additional actions with the related notes (not shown on FIG. 6A), such as merging one or more of such notes with the input and adding such new object to data collections; building a digest based on the input and the related notes; etc. After finishing reading and processing related notes, the user may close the pane 635 using a button 648.

Figure 6B:
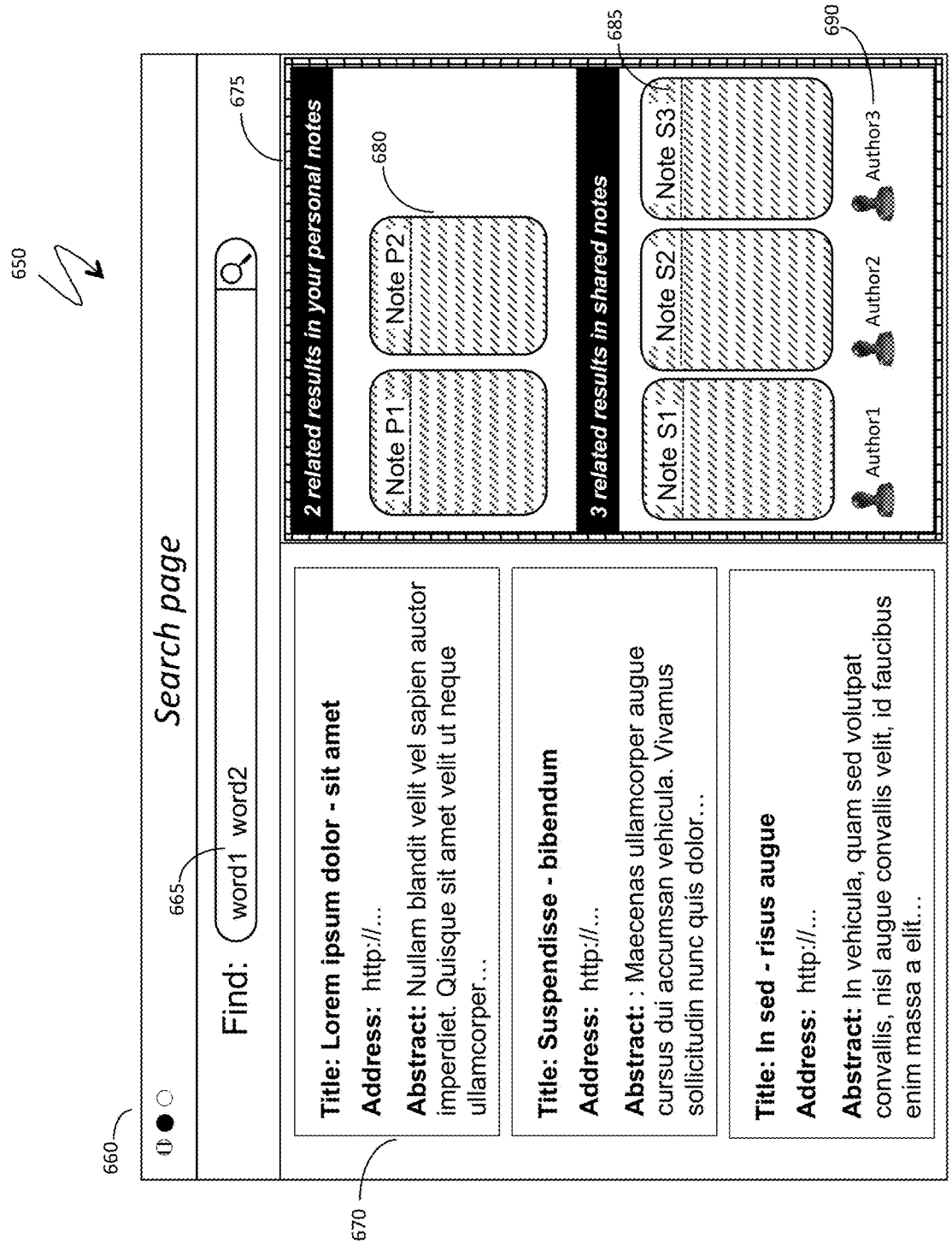

FIG. 6B is a schematic illustration 650, showing a display option for a list of related notes during a web search on a public web page, according to an embodiment of the system described herein. A web page 660 has a search field 665 where a user has entered an initial search term. A list of search results 670 returned by a public search engine is displayed on a page and is used for creating an extended query for multi-layer search, as explained elsewhere herein (see FIGS. 2 and 5). Search for terms of the extended query in personal and shared data collections reveals two parallel lists of personal and shared related notes. Related notes may be displayed, under the conditions and with the limitations explained elsewhere herein, in a pane 675 on the same page, alongside conventional search results. The pane may be split into two sections: a first section 680 for related notes retrieved from personal data collections and a second section 685 for related notes retrieved from shared data collections. Furthermore, the latter section may be supplied with indicators 690 of individual or collective authors of the corresponding shared collections.

Figure 7A:
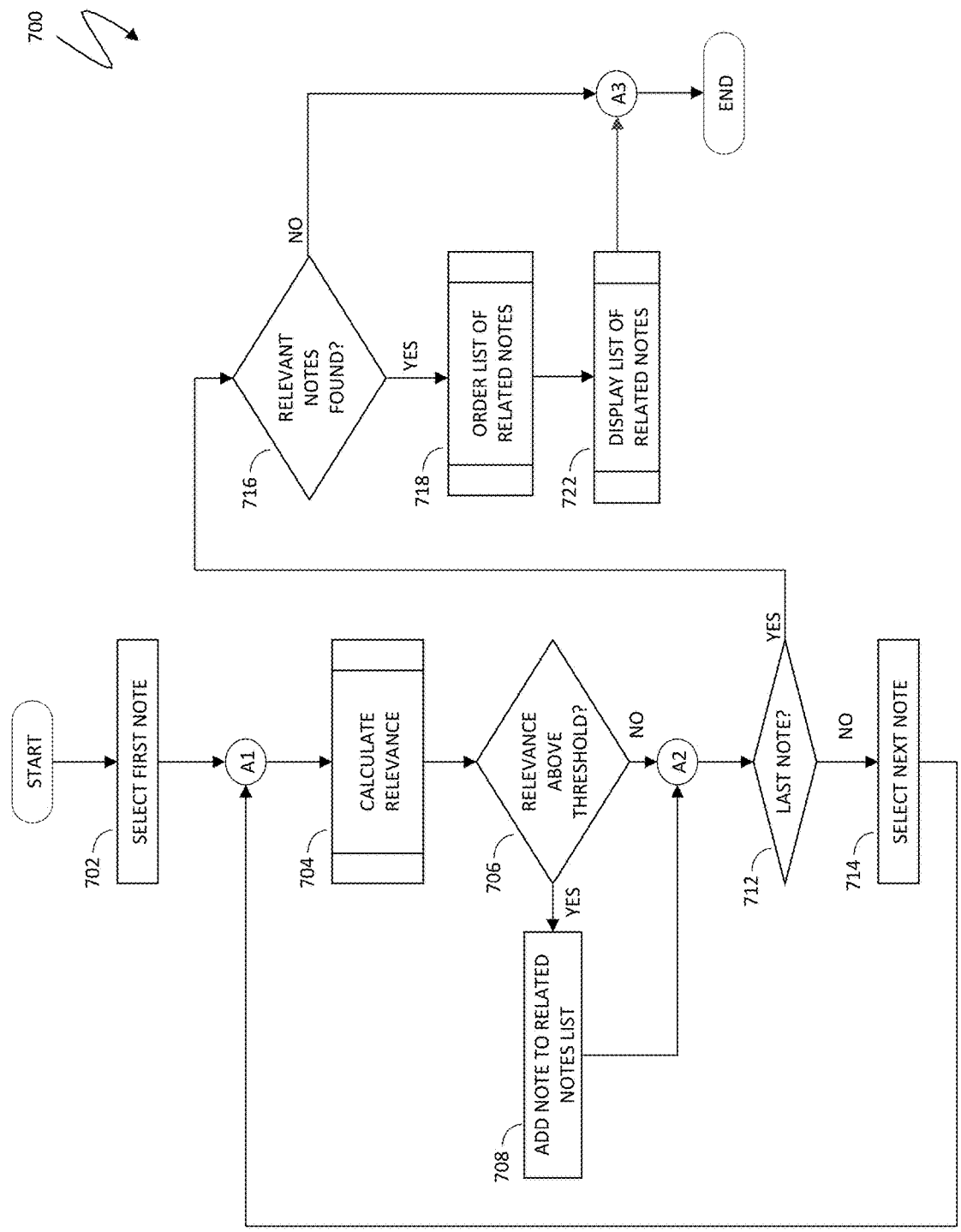

Referring to FIG. 7A, a flow diagram 700 illustrates processing performed in connection with building and displaying the list of related notes in a scenario with direct user input, which may be a document, a web page, an article extracted from a web page or a portion thereof. Processing starts at a step 702 where the system selects a first note from a personal, shared or combined data collection. After the step 702, processing proceeds to a step 704, where the relevance of the selected note is determined. Calculating the relevance at the step 704 is discussed in more detail elsewhere herein.

Following the step 704 is a test step 706 where it is determined whether the relevance value determined at the step 704 is above a pre-defined threshold. If so, processing proceeds to the step 708 where the current note is added to a list of related notes; otherwise, the current note is discarded and processing proceeds to a test step 712. After the addition of the current note to the list of related notes at the step 708, processing also proceeds to the test step 712 where it is determined whether the last note in the data collection(s) has been processed. If not, then processing proceeds to a step 714 where the next note is selected from the data collection(s) and processing returns back to the step 704, discussed above, for another iteration.

If it is determined at the test step 712 that the last note in the data collection(s) has been processed, processing proceeds from the test step 712 to a test step 716 where it is determined whether relevant notes are found. If not, then processing is complete. Otherwise, processing proceeds to a step 718 where the list of related notes is ordered by relevance. After the step 718, processing proceeds to a step 722, where the list of related notes is displayed to the user. An illustration of such a display is provided in FIG. 6A. Prior to displaying the notes, a few top items from the list of related notes may be chosen to accommodate size limitations of the display area. After the step 722, processing is complete.

Referring to FIG. 7B, a flow diagram 730 illustrates in more detail processing performed at the step 704, discussed above, where relevance of a note is determined. Processing begins at a first step 732, where the system selects a first criterion from a list of criteria that define the relevance of the note for the input. It may be, for example, a Title criterion (title of notes) that compares the titles of the note and the web page on which the input has been defined; or, it may be a Body criterion that directly compares the selected input text with the body of the currently processed note (see FIGS. 1, 3 for further details). After the step 732, processing proceeds to a step 734, where term frequency vectors are built, as illustrated in FIG. 3. After the step 734, processing proceeds to a step 736, where a partial relevance value for the chosen note with respect to the chosen criterion is calculated; this is illustrated on FIG. 4. After the step 736, processing proceeds to a step 738, where an overall (aggregated) relevance value is updated, as explained elsewhere herein. After the step 738, processing proceeds to a test step 742, where it is determined whether a last criterion has been processed. If so, then processing is complete; otherwise, processing proceeds to a step 744 where a next criterion is selected. After the step 744, processing proceeds back to the step 734, discussed above, for another iteration.

Referring to FIG. 7C, a flow diagram 750 illustrates in more detail processing provided at the step 734 where the term frequency vectors are built for a given input, note, and criterion. Processing starts at a step 752 where the system extracts from the input a text component specific for a given criterion (characteristics); the text component may be a title, a body or other selected text from the body of a document, a web page or an article. After the step 752, processing proceeds to a step 754, where a same operation of extracting a criterion specific text is applied to the current note (the note currently being processed). After the step 754, processing proceeds to a step 756, where the coordinates of term frequency vectors are built (see FIG. 3).

After the step 756, processing proceeds to a step 758, where the system chooses a first coordinate (term) of the term frequency vector. After the step 758, processing proceeds to a step 762, where a tf*idf value of the chosen term is calculated for the input, resulting in the coordinate value for the first, input-related term frequency vector. The variable tf corresponds to the term frequency (number of times the term appears) of the term in the input. The variable idf corresponds to the inverse document frequency of a term. Generally, the inverse document frequency of a term in a document represents the number of times a term appears in all documents of a corpus (set of documents) except the document in question. In the case of the step 762, the idf is the number of times the term in question appears in all of the notes not counting the input.

After the step 762, processing proceeds to a step 764, where tf*idf is calculated for the note resulting in the value of the same coordinate of the second, note-related term frequency vector. After the step 764, processing proceeds to a test step 768, where it is determined whether the last coordinate has been processed. If so, then processing is complete; otherwise, processing proceeds to a step 772 where the next coordinate of the term frequency vectors is selected. After the step 772, processing proceeds back to the step 762, discussed above, for another iteration.

Figure 7D:
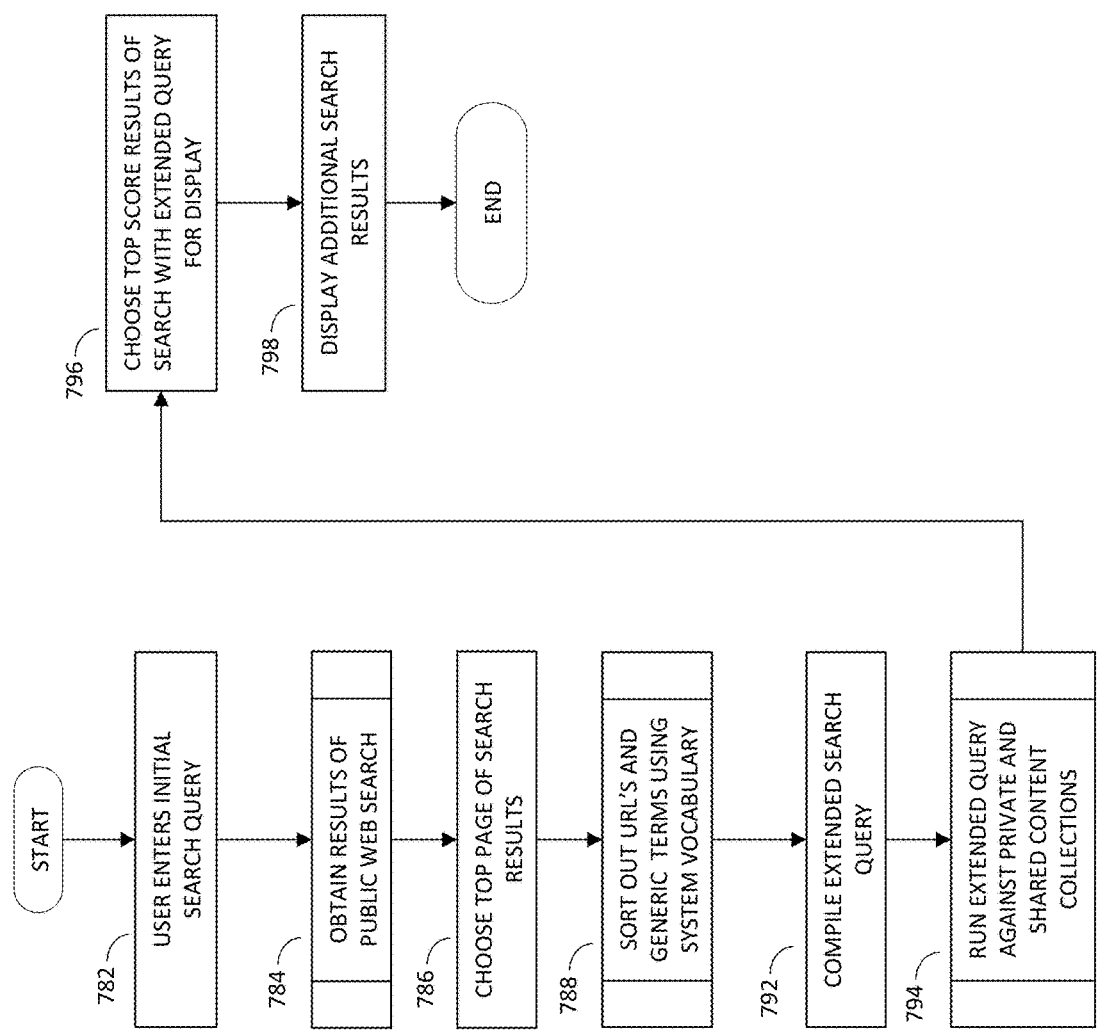

Referring to FIG. 7D, a flow diagram 780 illustrates processing performed in connection with a multi-layer search and creation of an extended query. Processing starts at a step 782 where a user enters an initial search query into a public search engine or a search interface of personal and/or shared data collections. After the step 782, processing proceeds to a step 784, where the system obtains results of a public web search for the user query. The results may be obtained either directly of via a programmatic call of the search engine by the system (see FIG. 2 and the accompanying text). After the step 784, processing proceeds to a step 786, where the system chooses the top page of search results or chooses a certain number of search results, depending on system settings. After the step 786, processing proceeds to a step 788, where snippets of search results (e.g., titles, web addresses, abstracts, etc.) are processed by deleting URLs and sorting out generic terms using a special system vocabulary (explained on FIG. 5 and in the accompanying text).

After the step 788, processing proceeds to a step 792, where an extended search query is compiled by merging and post-processing the filtered snippets, as explained elsewhere herein. After the step 792, processing proceeds to a step 794, where the extended search query is executed against available private and/or shared data collections. The additional relevant notes may be ranked, as explained elsewhere herein. After the step 794, processing proceeds to a step 796, where the top score search results obtained with the extended query are chosen for display. After the step 796, processing proceeds to a step 798, where additional search results are displayed to the user (see, for example, FIG. 6B). After the step 798, processing is complete.

Various embodiments discussed herein may be combined with each other in appropriate combinations in connection with the system described herein. Additionally, in some instances, the order of steps in the flowcharts, flow diagrams and/or described flow processing may be modified, where appropriate. Subsequently, elements and areas of screen described in screen layouts may vary from the illustrations presented herein. Further, various aspects of the system described herein may be implemented using software, hardware, a combination of software and hardware and/or other computer-implemented modules or devices having the described features and performing the described functions. Although the system herein has been illustrated with digital notes in digital notebook(s) like those provided in the Evernote product described herein, it will be appreciated by one of ordinary skill in the art that the system may be extended to work with any data subsets in one or more data collections having properties sufficient to implement the functionality described herein. The system described herein may work with a desktop, a laptop, and/or any other computing device in addition to a mobile device.

Software implementations of the system described herein may include executable code that is stored in a computer readable medium and executed by one or more processors. The computer readable medium may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer readable medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of displaying relevant data subsets of at least one data collection in a cloud-based database, comprising:
  receiving from a user a first input that includes a clipping command to clip a user-designated portion of a web page that is on display in a web browser of the user;
  in response to the first input:
    obtaining a clipped portion that includes the user-designated portion of the web page;
    accessing the at least one data collection of a plurality of data collections in the cloud-based database, the at least one data collection being distinct from the web page, wherein the plurality of data collections includes a private data collection of the user including one or more private notes and a shared data collection of the user distinct from the private collection including one or more shared stored notes;
    obtaining from the private data collection a plurality of stored private notes, wherein the stored private notes were previously saved by the user in the private data collection;
    obtaining from the shared data collection a plurality of stored shared notes, wherein one or more of the stored shared are accessible to the user;

for each note in the plurality of stored private notes and the plurality of stored shared notes, determining a respective relevance value between the clipped portion and the each note according to a term frequency of terms in the clipped portion that are linguistically similar to terms in the each note;

determining a relevant subset of the plurality of stored private notes and a relevant subset of the plurality of stored shared notes for which the respective relevance values exceed a predefined relevance threshold;

while the web page is on display in the web browser of the user, displaying in a distinct display region in conjunction with the displayed web page at least a portion of the relevant subset of the plurality of stored private notes and at least a portion of the relevant subset of the plurality of stored shared notes; and receiving, from the user, a second input for merging the user-designated portion of the web page indicated by the first input and content of one or more respective notes of the relevant subset of the plurality of stored private notes; and in response to the second input, merging the user-designated portion of the web page indicated by the first input and content of the one or more respective notes of the relevant subset of the plurality of stored private notes, wherein merging the user-designated portion of the web page indicated by the first input and content of the one or more respective notes of the relevant subset of the plurality of stored private notes includes interlinking the user-designated portion of the web page indicated by the first input and content of the one or more respective notes of the relevant subset of the plurality of stored private notes.

2. A method, according to claim 1, wherein the at least a portion of the relevant subset of the plurality of stored private notes are displayed in a popup pane.

3. A method, according to claim 2, wherein the at least a portion of the relevant subset of the plurality of stored private notes that are displayed include a title of the web page and snippets of the stored private notes.

4. A method, according to claim 1, wherein the relevance value is an overall relevance based on a plurality of partial relevance values associated with similarities between the web page and respective characteristics of the each note, wherein the respective characteristics include at least one of: a title and a tag.

5. A method, according to claim 4, wherein the overall relevance value is a weighted sum of the partial relevance values using weights of the respective characteristics.

6. A method, according to claim 4, wherein the overall relevance is a minimum of the partial relevance values multiplied by weights of the respective characteristics.

7. The method of claim 4, wherein the respective characteristics include a physical location associated with entry of the each note.

8. The method of claim 4, wherein the respective characteristics include an update time associated the each note.

9. The method of claim 1, wherein the first input is issued in response to selection by the user of a clipping icon displayed in association with the web browser and the web page.

10. The method of claim 9, wherein the user designated portion is designated by the user through an interaction with the web page while it is on display in the web browser.

11. The method of claim 9, wherein the interaction comprises the user selecting the designated portion with a corresponding visual highlight shown on the web page while it is on display in the browser.

12. The method of claim 1, wherein the stored private notes include at least one of: a web page, search results from a public search engine, and a document.

13. The method of claim 1, wherein merging the user-designated portion of the web page indicated by the first input and content of the one or more respective notes of the relevant subset of the plurality of stored private notes includes generating a table of contents including a list of titles of the user-designated portion of the web page and content of the one or more respective notes of the relevant subset of the plurality of stored private notes.

14. The method of claim 1, wherein merging the user-designated portion of the web page indicated by the first input and content of the one or more respective notes of the relevant subset of the plurality of stored private notes includes generating a new object including the user-designated portion of the web page and content of a plurality of respective notes of the relevant subset of the plurality of stored private notes.

15. The method of claim 1, wherein displaying in the distinct display region in conjunction with the displayed web page at least the portion of the relevant subset of the plurality of stored private notes and at least the portion of the relevant subset of the plurality of stored shared notes includes excluding an unrelated subset of the plurality of stored private notes and an unrelated subset of the plurality of stored shaded notes that do not exceed the predefined relevance threshold.

16. The method of claim 1, further comprising:
receiving, from the user, a third input for merging the user-designated portion of the web page indicated by the first input and content of one or more respective notes of the relevant subset of the plurality of stored private notes and content of one or more respective notes of the relevant subset of the plurality of stored shared notes; and in response to the third input, merging the user-designated portion of the web page indicated by the first input and content of the one or more respective notes of the relevant subset of the plurality of stored private notes and content of one or more respective notes of the relevant subset of the plurality of stored shared notes.

17. A non-transitory computer readable storage medium storing one or more programs configured for execution by a computer system for displaying relevant data subsets of at least one data collection in a cloud-based database, the computer system including a processor and a memory configured to store the one or more programs for execution by the processor, the one or more programs being configured to, when executed by the computer system, cause the computer system to perform operations comprising:

receiving from a user a first input that includes a clipping command to clip a user-designated portion of a web page that is on display in a web browser of the user;

in response to the first input:
obtaining a clipped portion that includes the user-designated portion of the web page;
accessing the at least one data collection of a plurality of data collections in the cloud-based database, the at least one data collection being distinct from the web page, wherein the plurality of data collections includes a private data collection of the user including one or more private notes and a shared data collection of the user distinct from the private collection including one or more shared stored notes;

obtaining from the private data collection a plurality of stored private notes, wherein the stored private notes were previously saved by the user in the private data collection;

obtaining from the shared data collection a plurality of stored shared notes, wherein one or more of the stored shared are accessible to the user;

for each note in the plurality of stored private notes and the plurality of stored shared notes, determining a respective relevance value between the clipped portion and the each note according to a term frequency of terms in the clipped portion that are linguistically similar to terms in the each note;

determining a relevant subset of the plurality of stored private notes and a relevant subset of the plurality of stored shared notes for which the respective relevance values exceed a predefined relevance threshold;

while the web page is on display in the web browser of the user, displaying in a distinct display region in conjunction with the displayed web page at least a portion of the relevant subset of the plurality of stored private notes and at least a portion of the relevant subset of the plurality of stored shared notes; and receiving, from the user, a second input for merging the user-designated portion of the web page indicated by the first input and content of one or more respective notes of the relevant subset of the plurality of stored private notes; and in response to the second input, merging the user-designated portion of the web page indicated by the first input and content of the one or more respective notes of the relevant subset of the plurality of stored private notes, wherein merging the user-designated portion of the web page indicated by the first input and content of the one or more respective notes of the relevant subset of the plurality of stored private notes includes interlinking the user-designated portion of the web page indicated by the first input and content of the one or more respective notes of the relevant subset of the plurality of stored private notes.

18. The computer readable storage medium of claim 17, wherein the at least a portion of the relevant subset of the plurality of stored private notes is displayed in a popup pane.

19. The computer readable storage medium of claim 18, wherein the at least a portion of the relevant subset of the plurality of stored private notes that is displayed include a title of the web page and snippets of the stored private notes.

20. The computer readable storage medium of claim 17, wherein the relevance value is an overall relevance based on a plurality of partial relevance values associated with similarities between the web page and respective characteristics of the each note, wherein the respective characteristics include at least one of: a title and a tag.

21. The computer readable storage medium of claim 20, wherein overall relevance is a weighted sum of the partial relevance values using weights of the respective characteristics.

22. The computer readable storage medium of claim 20, wherein relevance is a minimum of the partial relevance values multiplied by weights of the respective characteristics.

* * * * *